United States Patent
Toda et al.

(10) Patent No.: US 10,031,513 B2
(45) Date of Patent: Jul. 24, 2018

(54) CONTROL APPARATUS OF ROBOT OR MACHINE TOOL, WIRELESS TEACHING PENDANT, AND AUTOMATIC MACHINE SYSTEM

(71) Applicant: FANUC CORPORATION, Yamanashi (JP)

(72) Inventors: Shuntaro Toda, Yamanashi (JP); Ryoutarou Inaba, Yamanashi (JP); Yoshiki Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 318 days.

(21) Appl. No.: 15/072,307

(22) Filed: Mar. 16, 2016

(65) Prior Publication Data
US 2016/0282845 A1   Sep. 29, 2016

(30) Foreign Application Priority Data
Mar. 23, 2015   (JP) .................. 2015-059902

(51) Int. Cl.
*B25J 9/16* (2006.01)
*G05B 19/409* (2006.01)
*B25J 13/00* (2006.01)
*B25J 13/06* (2006.01)

(52) U.S. Cl.
CPC ............ *G05B 19/409* (2013.01); *B25J 9/161* (2013.01); *B25J 13/006* (2013.01); *B25J 13/06* (2013.01); *G05B 2219/33192* (2013.01); *G05B 2219/36159* (2013.01)

(58) Field of Classification Search
CPC ........ G05B 2219/36162; G05B 19/409; G05B 19/423; B25J 19/06; B25J 13/006
See application file for complete search history.

(56) References Cited

U.S. PATENT DOCUMENTS

| | | | | |
|---|---|---|---|---|
| 4,359,725 A | * | 11/1982 | Balogh | B60K 28/06 180/272 |
| 9,902,060 B2 | * | 2/2018 | Inaba | H04W 76/25 |
| 2007/0297890 A1 | * | 12/2007 | Sjoberg | B25J 13/065 414/735 |
| 2009/0030550 A1 | * | 1/2009 | Nagata | B25J 19/06 700/251 |
| 2016/0089790 A1 | * | 3/2016 | Wang | B25J 9/1676 700/255 |

FOREIGN PATENT DOCUMENTS

| | | |
|---|---|---|
| JP | 2004-148488 A | 5/2004 |
| JP | 2007-233817 A | 9/2007 |
| JP | 2008-93743 A | 4/2008 |
| JP | 2013-52462 A | 3/2013 |
| JP | 2013-114345 A | 6/2013 |
| WO | 2013/112565 A1 | 8/2013 |

\* cited by examiner

*Primary Examiner* — Timothy R Waggoner
(74) *Attorney, Agent, or Firm* — Hauptman Ham, LLP

(57) ABSTRACT

A wireless teaching pendant for operating a control apparatus of a robot or a machine tool by wireless communication includes a wireless communication unit for performing wireless communication with the control apparatus and a transmission interval change unit for changing a transmission interval of periodic data transmitted by the wireless communication unit to the control apparatus.

16 Claims, 6 Drawing Sheets

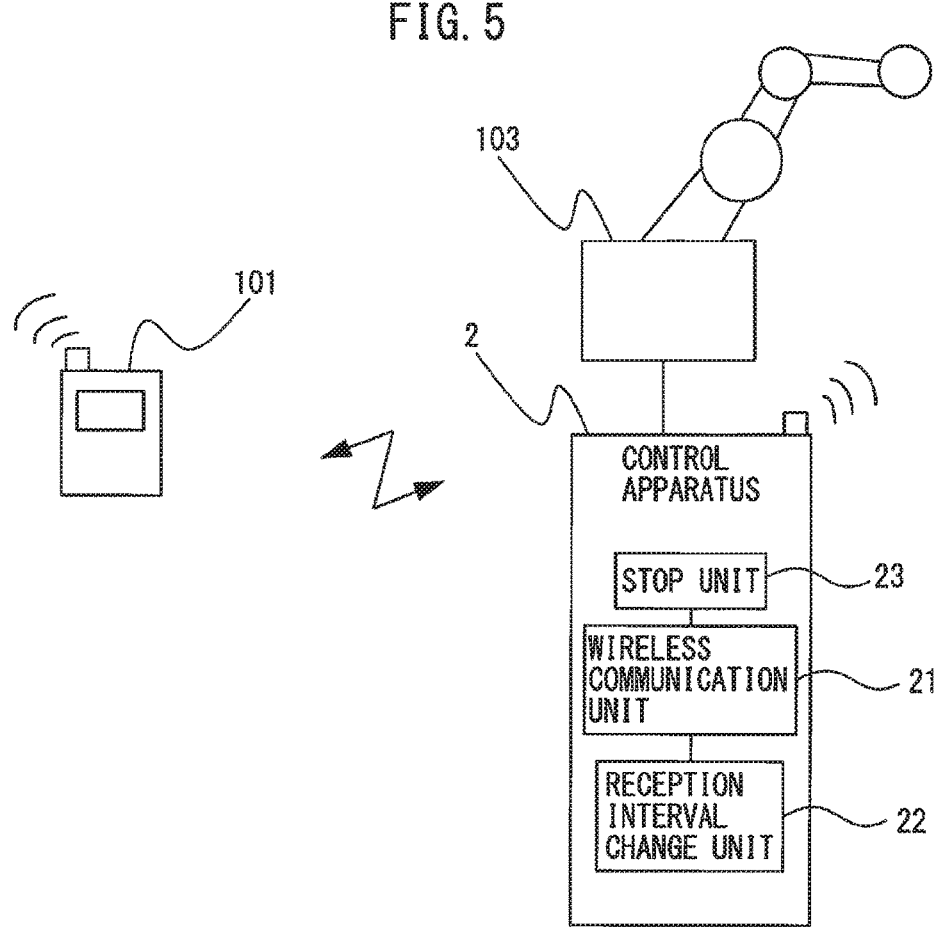
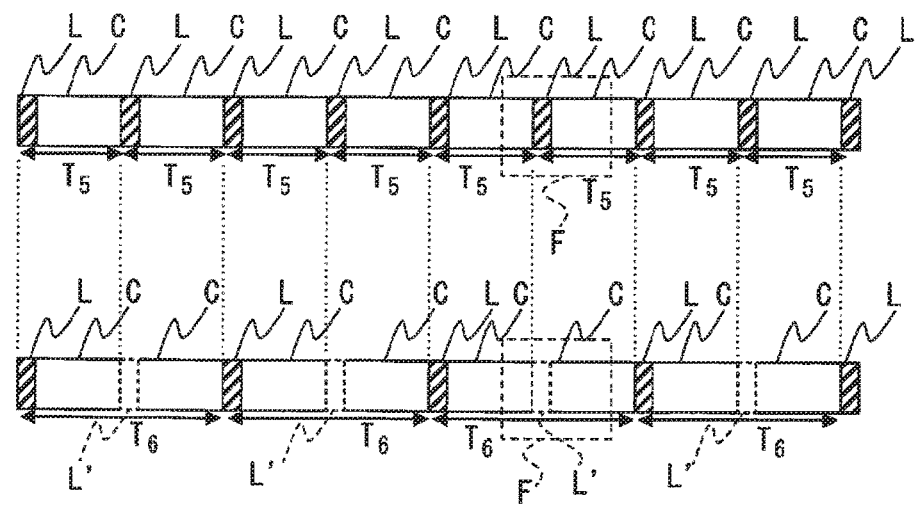

FIG. 9
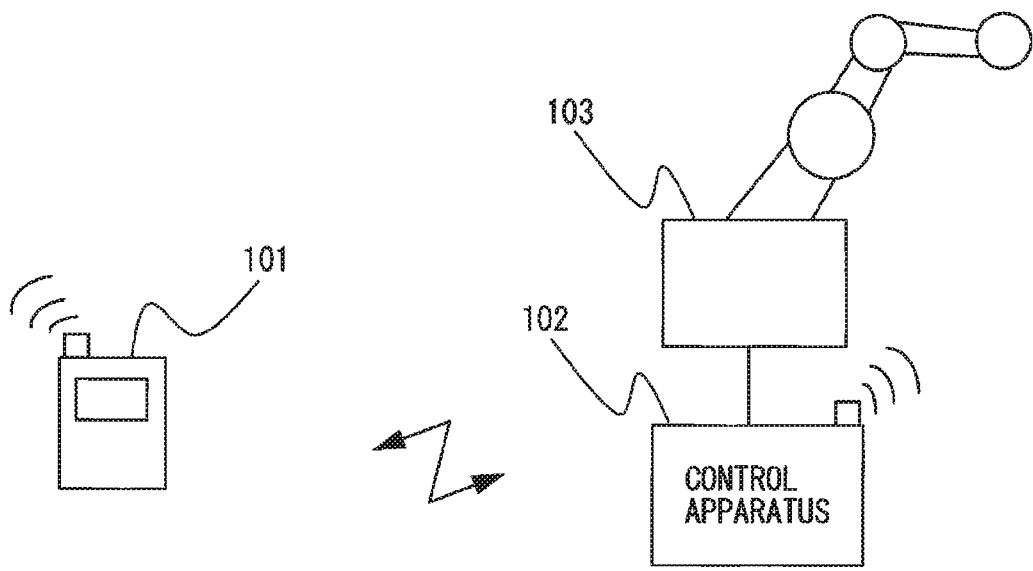
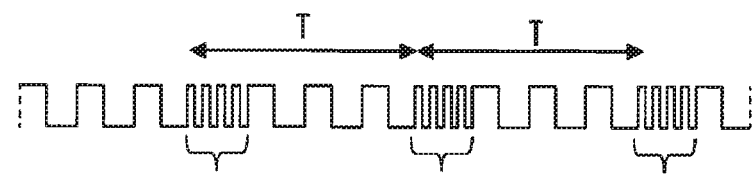
FIG. 10A
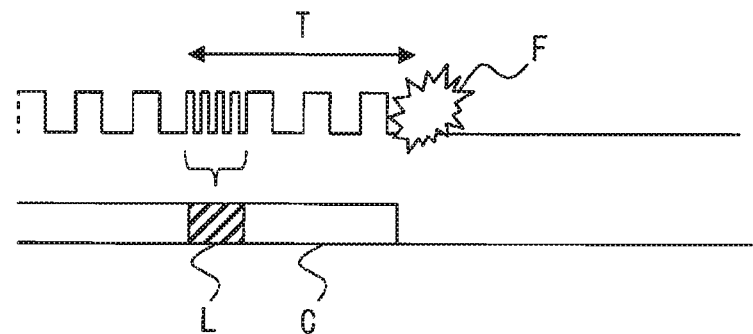
FIG. 10B

CONTROL APPARATUS OF ROBOT OR MACHINE TOOL, WIRELESS TEACHING PENDANT, AND AUTOMATIC MACHINE SYSTEM

RELATED APPLICATIONS

The present application claims priority to Japanese Patent Application Number 2015-059902, filed Mar. 23, 2015, the disclosure of which is hereby incorporated by reference herein in its entirety.

BACKGROUND OF THE INVENTION

1. Field of the Invention

The present invention relates to a wireless teaching pendant for operating a control apparatus of a robot or a machine tool by wireless communication, the control apparatus of the robot or the machine tool to be operated from the wireless teaching pendant by wireless communication, and an automatic machine system including the same.

2. Description of the Related Art

In order to operate automatic machines, such as robots or computerized numerical control (CNC) machine tools (hereinbelow, simply referred to as "machine tools"), portable wireless teaching pendants are used by being connected to control apparatuses of the robots or the machine tools via wireless communication. FIG. 9 is a schematic drawing of a general automatic machine system including a control apparatus of a robot and a wireless teaching pendant. A robot 103 is illustrated as an example of an automatic machine. A control apparatus 102 for controlling the robot 103 and a portable wireless teaching pendant 101 are connected to each other by wireless communication. An operator can perform registration, edition, condition setting, and status display of an operation program regarding the robot 103 and teaching to the robot 103 using the wireless teaching pendant 101. The robot 103 can be stopped in emergency by operating the wireless teaching pendant 101.

Generally, in the automatic machine system including the control apparatus of the robot or the machine tool and the wireless teaching pendant, a LIVE signal for confirming establishment of wireless communication between the wireless teaching pendant and the control apparatus is periodically transmitted from the wireless teaching pendant to the control apparatus so as to avoid unexpected operations of the robot or the machine tool and ensure safety of surrounding machines and operators. The control apparatus cannot easily control the robot or the machine tool unless receiving the LIVE signal. FIG. 10A and FIG. 10B illustrate transmission and reception of LIVE signals in the automatic machine system including the control apparatus of the robot or the machine tool and the wireless teaching pendant. As illustrated in FIG. 10A, data for one period transmitted from the wireless teaching pendant to the control apparatus of the robot or the machine tool is constituted of a LIVE signal L and data C in which an operation content of the robot or the machine tool is specified. The wireless teaching pendant periodically transmits the LIVE signal L to the control apparatus in a constant period T, and as long as the LIVE signal L is received, the control apparatus can control the robot or the machine tool according to the operation content specified in the data C. When wireless communication becomes unstable because of some obstacles, interference with other wireless communication, and the like, and the control apparatus cannot easily receive the LIVE signal L periodically transmitted from the wireless teaching pendant as illustrated in FIG. 10B (indicated by a reference numeral F in the drawing), the control apparatus performs control of an emergency stop on the robot or the machine tool or control of a protective stop as needed.

Further, in the automatic machine system including the control apparatus of the robot or the machine tool and the wireless teaching pendant, an emergency stop and a protective stop of the robot or the machine tool are generally performed by an operation of an operator him/herself so as to ensure safety of the robot or the machine tool, the surrounding machines, and the operator in the emergency situations. In such a case, when an emergency stop switch disposed to the wireless teaching pendant is pressed by the operator, a state signal (an emergency stop signal) indicating that the robot or the machine tool is stopped in emergency is transmitted from the wireless teaching pendant to the control apparatus in a constant period, and the control apparatus received the state signal indicating performing of the emergency stop performs control to stop the robot or the machine tool in emergency.

For example, as described in Japanese Unexamined Patent Publication No. 2007-233817, there is a technique for monitoring a detection interval of a LIVE signal transmitted from the wireless teaching pendant to a controller, recognizing deterioration of a communication state of the wireless communication, and ensuring safety by stopping the machine.

In the automatic machine system including the control apparatus of the robot or the machine tool and the wireless teaching pendant, as a repeating period of the LIVE signal periodically transmitting from the wireless teaching pendant to the control apparatus of the robot or the machine tool is shorter, safety is more increased since the robot or the machine tool can be stopped in emergency in a brief disruption of wireless communication, however, a possibility becomes higher that the control apparatus cannot easily receive the LIVE signal because wireless communication becomes unstable because of obstacles, interference with other wireless communication, and the like. In other words, the shorter the repeating period of the LIVE signal is, the higher the possibility of frequently causing an emergency stop resulting from instability of wireless communication becomes, which impairs convenience.

In addition, if there is an occasion when the communication becomes unstable between the wireless teaching pendant and the control apparatus, and the control apparatus cannot easily receive the state signal (the emergency stop signal) indicating performing of the emergency stop transmitted from the wireless teaching pendant, it is dangerous since a time length and an operation distance until the robot or the machine tool stops in emergency become longer. FIG. 11A and FIG. 11B illustrate transmission and reception of emergency stop signals in the automatic machine system including the control apparatus of the robot or the machine tool and the wireless teaching pendant. When the emergency stop switch disposed to the wireless teaching pendant is pressed by the operator, a state signal indicating performing of the emergency stop as illustrated in FIG. 11A is transmitted from the wireless teaching pendant to the control apparatus at every constant period. The control apparatus received the state signal indicating performing of the emergency stop performs control to stop the robot or the machine tool in emergency. However, if there is an occasion when the wireless communication becomes unstable because of obstacles, interference with other wireless communication, and the like, and the control apparatus cannot easily receive the emergency stop signal as illustrated in FIG. 11B (indicated by the reference numeral F in the drawing), it is impossible for the control apparatus to perform control to stop the robot or the machine tool in emergency during a time period S in the drawing, and accordingly, it is dangerous since a time length and an operation distance until the robot or the machine tool stops in emergency become longer.

SUMMARY OF THE INVENTION

A purpose of the present invention is directed to the provision of a wireless teaching pendant, a control apparatus of a robot or a machine tool, and an automatic machine system including the same which are reliable and can ensure safety even when wireless communication is unstable between the wireless teaching pendant and the control apparatus of the robot or the machine tool in consideration of the above-described problems.

For achieving the above-mentioned purpose, according to a first aspect, a wireless teaching pendant for operating a control apparatus of a robot or a machine tool by wireless communication includes a wireless communication unit configured to perform wireless communication with the control apparatus and a transmission interval change unit configured to change a transmission interval of periodic data transmitted by the wireless communication unit to the control apparatus.

According to the first aspect, the transmission interval change unit may change the transmission interval in response to operation speed information indicating an operation speed of the robot or the machine tool received from the control apparatus via the wireless communication unit.

According to the first aspect, the transmission interval change unit may set the transmission interval of when an operation speed of the robot or the machine tool indicated by the operation speed information is fast shorter than the transmission interval of when an operation speed of the robot or the machine tool indicated by the operation speed information is slow.

According to the first aspect, the transmission interval change unit may set the transmission interval in an inverse proportion relationship in which the transmission interval is shortened along with an increase of an operation speed of the robot or the machine tool indicated by the operation speed information.

According to the first aspect, the transmission interval change unit may set the transmission interval of when operation mode information of the robot received from the control apparatus via the wireless communication unit indicates a manual high speed mode shorter than the transmission interval of when the operation mode information indicates a manual reduced speed mode.

According to the first aspect, the periodic data may be a LIVE signal for confirming that wireless communication is established by the wireless communication unit with the control apparatus.

According to the first aspect, the periodic data may be a state signal indicating whether to stop the robot or the machine tool in emergency transmitted from the wireless teaching pendant to the control apparatus.

According to a second aspect, a control apparatus of a robot or a machine tool controlled from a wireless teaching pendant by wireless communication includes a wireless communication unit configured to perform wireless communication with the wireless teaching pendant and a reception interval change unit configured to change a reception interval by the wireless communication unit of periodic data used for determination of whether to stop an operation of the robot or the machine tool transmitted from the wireless teaching pendant.

According to the second aspect, the reception interval change unit may change the reception interval in response to operation speed information indicating an operation speed of the robot or the machine tool.

According to the second aspect, the reception interval change unit may set the reception interval of when an operation speed of the robot or the machine tool indicated by the operation speed information is fast shorter than the reception interval of when an operation speed of the robot or the machine tool indicated by the operation speed information is slow.

According to the second aspect, the reception interval change unit may set the reception interval in an inverse proportion relationship in which the reception interval is shortened along with an increase of an operation speed of the robot or the machine tool indicated by the operation speed information.

According to the second aspect, the reception interval change unit may set the reception interval of when an operation mode of the robot is a manual high speed mode shorter than the reception interval of when an operation mode of the robot is a manual reduced speed mode.

According to the second aspect, the periodic data may be a LIVE signal for confirming that wireless communication is established by the wireless communication unit with the wireless teaching pendant, and the control apparatus may include a stop unit configured to stop an operation of the robot or the machine tool when the wireless communication unit is not able to receive the LIVE signal within a time period determined by the reception interval.

According to the second aspect, the periodic data may be a state signal indicating whether to stop the robot or the machine tool in emergency transmitted from the wireless teaching pendant to the control apparatus, and the control apparatus may include a stop unit configured to stop an operation of the robot or the machine tool when the wireless communication unit is not able to receive the state signal within a time period determined by the reception interval.

According to the second aspect, the wireless communication unit may be connected to the reception interval change unit via a wired network.

As described above, according to the present invention, the automatic machine system including the control apparatus of the robot or the machine tool and the wireless teaching pendant connected to the control apparatus via wireless communication and configured to operate the control apparatus includes a wireless communication unit configured to perform wireless communication between the wireless teaching pendant and the control apparatus and an interval change unit configured to change a transmission interval from the wireless teaching pendant or a reception interval by the control apparatus of periodic data used by the control apparatus for determination of whether to stop an operation of the robot or the machine tool, wherein the periodic data is transmitted from the wireless teaching pendant to the control apparatus.

BRIEF DESCRIPTION OF THE DRAWINGS

The present invention will be more clearly understood with reference to the attached drawings.

FIG. 5 illustrates a control apparatus of a robot according to a second embodiment.

FIG. 6A illustrates reception intervals of LIVE signals received by the control apparatus from the wireless teaching pendant when the reception interval is set short.

FIG. 6B illustrates reception intervals of LIVE signals received by the control apparatus from the wireless teaching pendant when the reception interval is set long.

FIG. 9 is a schematic drawing of a general automatic machine system including the control apparatus of the robot and the wireless teaching pendant.

FIG. 10A and FIG. 10B illustrate transmission and reception of LIVE signals in the automatic machine system including the control apparatus of the robot or the machine tool and the wireless teaching pendant.

DETAILED DESCRIPTION

A control apparatus of a robot or a machine tool, a wireless teaching pendant, and an automatic machine system will be described below with reference to the attached drawings. However, it is note that the present invention is not limited by the drawings and embodiments described below.

According to the present invention, the automatic machine system including the control apparatus of the robot or the machine tool and the wireless teaching pendant which is connected to the control apparatus by wireless communication and operates the control apparatus includes a wireless communication unit configured to perform wireless communication between the wireless teaching pendant and the control apparatus and an interval change unit configured to change a transmission interval from the wireless teaching pendant or a reception interval by the control apparatus of periodic data which is transmitted from the wireless teaching pendant to the control apparatus and used for determining whether to stop an operation of the robot or the machine by the control apparatus. The robot or the machine tool controlled by the control apparatus can be collectively referred to as "automatic machines", and the present invention can be applied to both of when a control target of the control apparatus is the robot and when that is the machine tool. According to the embodiments described below, the robot is a control target of the control apparatus, however, a similar principle of operation can be applied when the control target of the control apparatus is the machine tool. In the first embodiment, a transmission interval of periodic data from the wireless teaching pendant is changed, and in the second embodiment, a reception interval of the periodic data by the control apparatus is changed.

Figure 1:
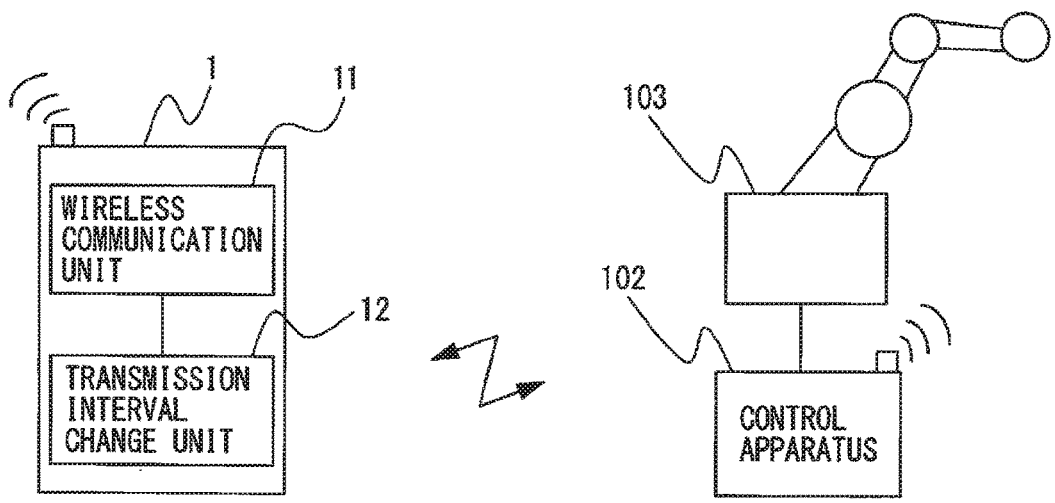
FIG. 1 illustrates a wireless teaching pendant according to a first embodiment.

FIG. 1 illustrates the wireless teaching pendant according to the first embodiment. The control apparatus 102 for controlling the robot 103 is connected to a portable wireless teaching pendant 1 by wireless communication. According to the first embodiment, the wireless teaching pendant 1 includes a wireless communication unit 11 which performs wireless communication with the control apparatus 102 for controlling the robot 103 and a transmission interval change unit 12 which changes a transmission interval of periodic data transmitted by the wireless communication unit 11 to the control apparatus. An operator can perform registration, edition, condition setting, and status display of an operation program regarding the robot 103 and teaching to the robot 103 using the portable wireless teaching pendant 1. Further, the operator can stop the robot 103 in emergency by pressing an emergency stop button (not illustrated) of the wireless teaching pendant 1. Similar to an example illustrated in FIG. 8 described below, a wireless communication unit (not illustrated) in the control apparatus 102 may be configured to be connected to a main body of the control apparatus 102 via a wired network.

Periodic data to be transmitted to the control apparatus 102 by the wireless communication unit 11 of the wireless teaching pendant 1 may be a LIVE signal for confirming establishment of the wireless communication between the wireless communication unit 11 of the wireless teaching pendant 1 and the control apparatus 102 or a state signal which is transmitted from the wireless teaching pendant 1 to the control apparatus 102 and indicates whether to stop the robot 103 in emergency.

Figure 2A:
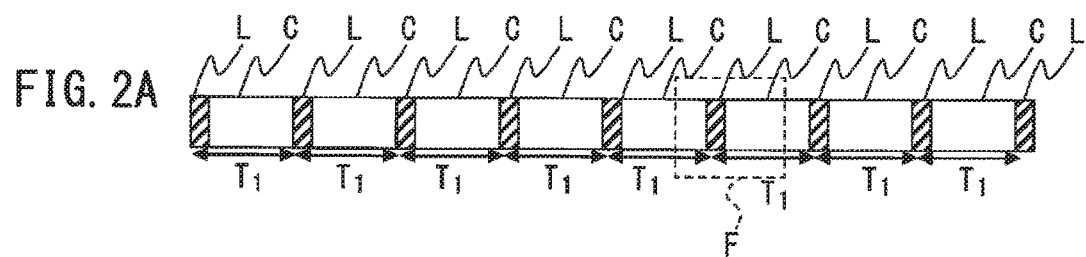
FIG. 2A illustrates transmission intervals of LIVE signals periodically transmitted from the wireless teaching pendant to a control apparatus when the transmission interval is set short.
Figure 2B:
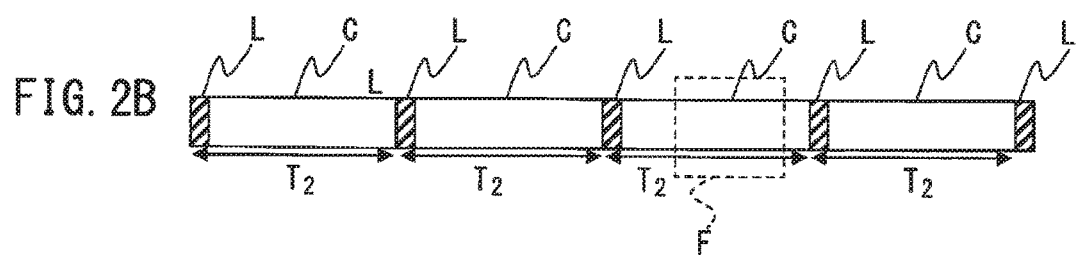
FIG. 2B illustrates transmission intervals of LIVE signals periodically transmitted from the wireless teaching pendant to the control apparatus when the transmission interval is set long.
Figure 3A:
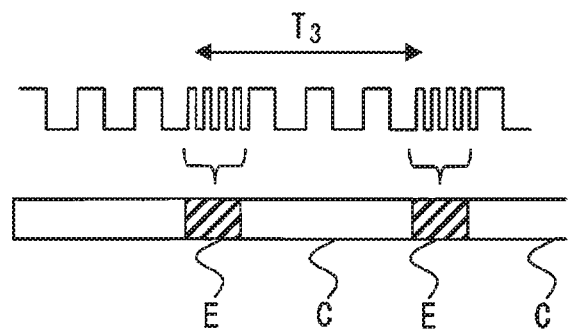
FIG. 3A illustrates transmission intervals of state signals indicating whether to stop a robot or a machine tool in emergency periodically transmitted from the wireless teaching pendant to the control apparatus when the transmission interval is set long.
Figure 3B:
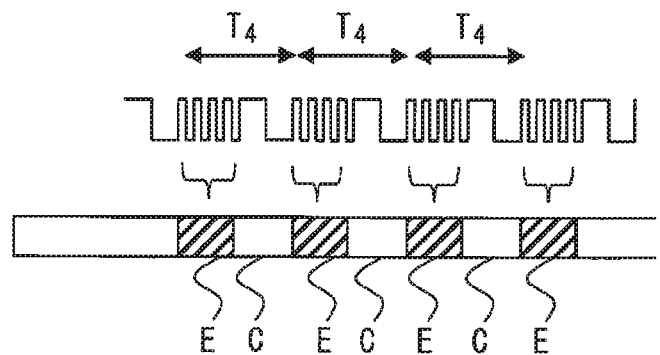
FIG. 3B illustrates transmission intervals of state signals indicating whether to stop the robot or the machine tool in emergency periodically transmitted from the wireless teaching pendant to the control apparatus when the transmission interval is set short.

According to the first embodiment, the transmission interval change unit 12 changes the transmission interval of the periodic data transmitted from the wireless communication unit 11 of the wireless teaching pendant 1 to the control apparatus 102 in response to operation speed information indicating an operation speed of the robot 103 received from the control apparatus 102 via the wireless communication unit 11 or in response to operation mode information of the robot 103 received from the control apparatus 102 via the wireless communication unit 11. In other words, the transmission interval of the periodic data transmitted from the wireless communication unit 11 of the wireless teaching pendant 1 to the control apparatus 102 is variable. The wireless communication unit 11 transmits the periodic data to the control apparatus 102 by wireless communication at the transmission interval set by the transmission interval change unit 12. FIG. 2A illustrates the transmission intervals of the LIVE signals periodically transmitted from the wireless teaching pendant to the control apparatus when the transmission interval is set short. FIG. 2B illustrates the transmission intervals of the LIVE signals periodically transmitted from the wireless teaching pendant to the control apparatus when the transmission interval is set long. In FIG. 2A and FIG. 2B, a symbol L indicates the LIVE signal, and a symbol C indicates data in which an operation content of the robot 103 is specified. FIG. 3A illustrates the transmission intervals of the state signals indicating whether to stop the robot or the machine tool in emergency periodically transmitted from the wireless teaching pendant to the control apparatus when the transmission interval is set long. FIG. 3B illustrates the transmission intervals of the state signals indicating whether to stop the robot or the machine tool in emergency periodically transmitted from the wireless teaching pendant to the control apparatus when the transmission interval is set short. In FIG. 3A and FIG. 3B, a symbol E indicates the state signal indicating whether to perform an emergency stop, and the symbol C indicates the data in which the operation content of the robot 103 is specified.

First, an example is described in which the transmission interval is changed by the transmission interval change unit 12 in response to the operation speed information indicating the operation speed of the robot 103 received from the control apparatus 102 via the wireless communication unit 11. For example, when the control target of the control apparatus is the robot, the operation speed of the robot to be specified in the operation speed information may be a speed of an end point of a tool attached to a tip end of a robot hand, a speed of a flange center of the tip end of the robot hand, a speed of each shaft of the robot, and the like. A case when periodically transmitted data is the LIVE signal (FIG. 2A and FIG. 2B) and a case when periodically transmitted data is the state signal indicating whether to perform an emergency stop (FIG. 3A and FIG. 3B) are separately described below.

When the operation speed of the robot 103 controlled by the control apparatus 102 is fast, and if it is impossible to perform an emergency stop immediately on the robot 103, it is dangerous because an operation distance becomes longer. Accordingly, it is desirable that the emergency stop is immediately performed when the LIVE signal cannot easily be received. Therefore, in the first embodiment, when the operation speed of the robot 103 is fast, the transmission interval of the LIVE signal is set short (a transmission period $T_1$) as illustrated in FIG. 2A so as to increase opportunities for the control apparatus 102 to receive the LIVE signal L per unit time. On the other hand, when the transmission period of the LIVE signal L is set short as described above, a possibility of frequently causing an emergency stop resulting from instability of wireless communication becomes higher. However, when the operation speed of the robot 103 controlled by the control apparatus 102 is slow, the operation distance of the robot 103 is short, and danger caused by the robot 103 to surroundings is small even if the robot 103 is not be able to be immediately stopped in emergency. In other words, if the robot 103 is not be able to be immediately stopped in emergency because the control apparatus 102 cannot easily receive the LIVE signal L, it does not cause such a big problem. Therefore, in the first embodiment, when the operation speed of the robot 103 is slow, the transmission interval of the LIVE signal L is set longer (a transmission period $T_2$ in FIG. 2B) than the transmission period $T_1$ of when the operation speed of the robot 103 is fast (FIG. 2A) so as not to stop the robot 103 in emergency too often and to improve convenience. In FIG. 2A and FIG. 2B, the reference numeral F indicates the LIVE signal which is impossible for the control apparatus 102 to receive.

Generally, the state signal is periodically transmitted from the wireless communication unit 11 of the wireless teaching pendant 1 to the control apparatus 102. In the state signal, whether to stop the robot 103 in emergency or not is specified, and the control apparatus 102 does not stop the robot 103 in emergency when the received state signal indicates "not stopping the robot 103 in emergency" and stops the robot 103 in emergency when the received state signal indicates "stopping the robot 103 in emergency". When the operation speed of the robot 103 controlled by the control apparatus 102 is fast, and if it is impossible to immediately perform the emergency stop on the robot 103, it is dangerous because the operation distance becomes longer. Accordingly, it is desirable that the control apparatus 102 certainly receives the state signal indicating whether to perform the emergency stop transmitted from the wireless teaching pendant 1 and immediately stops the robot 103 to ensure safety. Therefore, in the first embodiment, when the operation speed of the robot 103 is fast, the transmission interval of the state signal E indicating whether to perform the emergency stop is set short (a transmission period $T_4$) as illustrated in FIG. 3B so that the control apparatus 102 can certainly receive the state signal E indicating whether to perform the emergency stop. As described above, the transmission interval $T_4$ of the state signal E indicating whether to stop the robot or the machine tool in emergency is set short, and the robot 103 can be stopped in a short time after the state signal is output from the wireless teaching pendant 1. When communication becomes unstable and the state signal indicating whether to perform an emergency stop cannot easily be received, a next state signal can be received immediately, so that the robot 103 can be stopped in a short time. On the other hand, when the operation speed of the robot 103 controlled by the control apparatus 102 is slow, danger caused by the robot 103 to the surroundings is small even if the robot 103 is not be able to be immediately stopped in emergency. Thus, the transmission interval of the state signal E indicating whether to perform an emergency stop is set long (a transmission period $T_3$) as illustrated in FIG. 3A.

Figure 4:
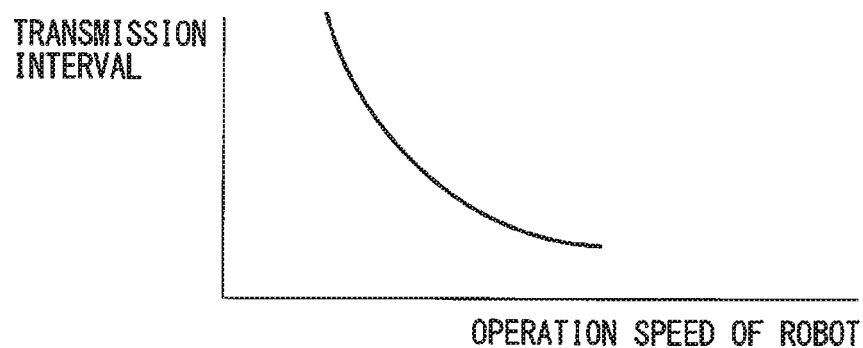
FIG. 4 illustrates an example of a relationship between a transmission interval of periodic data transmitted from the wireless teaching pendant to the control apparatus and an operation speed of the robot.

As described above, when the transmission interval is changed by the transmission interval change unit 12 in response to the operation speed information indicating the operation speed of the robot 103 received from the control apparatus 102 via the wireless communication unit 11, the transmission interval change unit 12 sets the transmission interval of when the operation speed of the robot 103 indicated by the operation speed information is fast shorter than the transmission interval of when the operation speed of the robot 103 indicated by the operation speed information is slow in any of these cases when the periodic data transmitted from the wireless teaching pendant 1 is the LIVE signal and when the periodic data is the state signal indicating whether to stop the robot or the machine tool in emergency. In other words, in the first embodiment, the transmission interval change unit 12 sets the transmission interval short when the operation speed of the robot 103 indicated by the operation speed information is fast (FIG. 2A and FIG. 3B) and sets the transmission interval long when the operation speed of the robot 103 indicated by the operation speed information is slow (FIG. 2B and FIG. 3A). FIG. 4 illustrates an example of a relationship between the transmission interval of the periodic data transmitted from the wireless teaching pendant to the control apparatus and the operation speed of the robot. As described above, in the first embodiment, the transmission interval change unit 12 sets the transmission interval short when the operation speed of the robot 103 indicated by the operation speed information is fast and sets the transmission interval long when the operation speed of the robot 103 indicated by the operation speed information is slow, and thus, for example, the transmission interval change unit 12 may set the transmission interval in an inverse proportion relationship in which the transmission interval is shortened along with an increase of the operation speed of the robot 103 indicated by the operation speed information as illustrated in FIG. 4.

Next, an example is described below in which the transmission interval is changed by the transmission interval change unit 12 in response to the operation mode information of the robot 103 received from the control apparatus 102 via the wireless communication unit 11.

According to International Organization for Standardization (ISO) 10218-1, three modes are specified as operation modes of a robot, i.e., an automatic mode, a manual reduced speed mode (also referred to as a "T1 mode" or a "teach mode"), and a manual high speed mode (also referred to as a "T2 mode" or a "high speed attended program verification mode"). In these modes, the "automatic mode" is a mode that the robot needs to execute a task program. The "manual reduced speed mode" is a mode to be used for performing jogging, teaching, and programming of the robot or verification of the program when the automatic mode is prohibited, and a speed of a tool center point (TCP) is required to be 250 [mm/s] or less. The "manual high speed mode" is a mode in which the robot can be operated at a speed exceeding 250 [mm/s]. In terms of the operation speed of the robot 103, it can be said that the manual reduced speed mode corresponds to "a case in which the operation speed of the robot 103 indicated by the operation speed information is slow" described above, and the manual high speed mode corresponds to "a case in which the operation speed of the robot 103 indicated by the operation speed information is fast" described above. Therefore, when the transmission interval is changed by the transmission interval change unit 12 in response to the operation mode information of the robot 103, a principle of operation similar to that of the operation speed information of the robot 103 described above can be applied. In other words, the transmission interval change unit 12 sets the transmission interval of when the operation mode information of the robot 103 received from the control apparatus 102 via the wireless communication unit 11 indicates the manual high speed mode shorter than the transmission interval of when the operation mode information indicates the manual reduced speed mode. In other words, the transmission interval change unit 12 sets the transmission interval short (FIG. 2A and FIG. 3B) when the robot 103 is in the manual high speed mode and sets the transmission interval long (FIG. 2B and FIG. 3A) when the robot 103 is in the manual reduced speed mode.

Next, the second embodiment is described. FIG. 5 illustrates the control apparatus of the robot according to the second embodiment. A control apparatus 2 for controlling the robot 103 and the portable wireless teaching pendant 101 are connected to each other by wireless communication. According to the second embodiment, the control apparatus 2 of the robot 103 includes a wireless communication unit 21 which performs wireless communication with the wireless teaching pendant 101, a reception interval change unit 22 which changes a reception interval by the wireless communication unit 21 of periodic data transmitted from the wireless teaching pendant 101 and used for determination of whether to stop an operation of the robot 103, and a stop unit 23 which stops the operation of the robot 103. An operator can perform registration, edition, condition setting, and status display of an operation program regarding the robot 103 and teaching to the robot 103 using the portable wireless teaching pendant 101. Further, the operator can stop the robot 103 in emergency by pressing the emergency stop button (not illustrated) of the wireless teaching pendant 101.

The periodic data to be transmitted from the wireless teaching pendant 101 and used for determination of whether to stop the operation of the robot 103 may be a LIVE signal for confirming establishment of the wireless communication between the wireless communication unit 21 of the control apparatus 2 and the wireless teaching pendant 101 or a state signal indicating whether to stop the robot 103 in emergency. When the wireless communication unit 21 cannot easily receive the LIVE signal within a time period determined by the reception interval set by the reception interval change unit 22, the stop unit 23 stops the operation of the robot 103. Further, when the state signal indicating whether to perform the emergency stop cannot easily be received within the time period determined by the reception interval set by the reception interval change unit 22, the stop unit 23 stops the operation of the robot 103.

According to the second embodiment, the reception interval change unit 22 changes the reception interval by the wireless communication unit 21 of the periodic data used for determination of whether to stop the operation of the robot 103 transmitted from the wireless teaching pendant 101 in response to the operation speed information indicating the operation speed of the robot 103 transmitted by the wireless communication unit 21 to the wireless teaching pendant 101 or in response to the operation mode of the robot 103. In other words, the reception interval of the periodic data received from the wireless teaching pendant 101 is variable. FIG. 6A illustrates the reception intervals of the LIVE signals received by the control apparatus from the wireless teaching pendant when the reception interval is set short. FIG. 6B illustrates the reception intervals of the LIVE signals received by the control apparatus from the wireless teaching pendant when the reception interval is set long. In FIG. 6A and FIG. 6B, the symbol L indicates the LIVE signal, and the symbol C indicates the data in which the operation content of the robot 103 is specified.

First, an example of changing the reception interval by the reception interval change unit 22 in response to the operation speed information indicating the operation speed of the robot 103 is described below by separating a case when the periodic data to be used for determination of whether to stop the robot 103 is the LIVE signal L and a case when the periodic data is the state signal E.

When the operation speed of the robot 103 controlled by the control apparatus 2 is fast, and if it is impossible to perform an emergency stop immediately on the robot 103, it is dangerous because the operation distance becomes longer. Accordingly, it is desirable that the emergency stop is immediately performed when the LIVE signal L cannot easily be received. Therefore, in the second embodiment, when the operation speed of the robot 103 is fast, the reception interval of the LIVE signal L is set short (a reception period $T_S$) as illustrated in FIG. 6A so as to increase opportunities for the control apparatus 102 to receive the LIVE signal L per unit time. On the other hand, when the reception period of the LIVE signal L is set short as described above, a possibility of frequently causing an emergency stop resulting from instability of wireless communication becomes higher. However, when the operation speed of the robot 103 controlled by the control apparatus 2 is slow, the operation distance of the robot 103 is short, and danger caused by the robot 103 to the surroundings is small even if the robot 103 is not be able to be immediately stopped in emergency. In other words, if the robot 103 is not be able to be immediately stopped in emergency because the control apparatus 2 cannot easily receive the LIVE signal L, it does not cause such a big problem. Therefore, in the second embodiment, when the operation speed of the robot 103 is slow, the reception interval of the LIVE signal L is set longer (a reception period $T_6$ in FIG. 6B) than the reception period $T_5$ of when the operation speed of the robot 103 is fast (FIG. 6A) so as not to stop the robot 103 in emergency too often and to improve convenience. When the wireless communication unit 21 cannot easily receive the LIVE signal within the time period determined by the reception interval set by the reception interval change unit 22, the stop unit 23 stops the operation of the robot 103. In FIG. 6A and FIG. 6B, the reference numeral F indicates the LIVE signal which is impossible for the control apparatus 102 to receive.

Further, when the operation speed of the robot 103 controlled by the control apparatus 2 is fast, and if it is impossible to immediately perform the emergency stop on the robot 103, it is dangerous because the operation distance becomes longer. Accordingly, it is desirable that the control apparatus 2 certainly receives the state signal indicating whether to perform the emergency stop transmitted from the wireless teaching pendant 1 and immediately stops the robot 103 to ensure safety. Therefore, in the second embodiment, when the operation speed of the robot 103 is fast, the reception interval of the state signal indicating whether to stop the robot 103 in emergency is set short so that the control apparatus 2 can certainly receive the state signal. Since the reception interval of the state signal indicating whether to perform the emergency stop is set short as described above, the operation of the robot 103 is stopped when the communication becomes unstable after the state signal is output from the wireless teaching pendant 101 and the state signal is not received within the time period determined by the above-described reception interval, so that the robot 103 can be stopped in a short time. On the other hand, when the operation speed of the robot 103 controlled by the control apparatus 2 is slow, danger caused by the robot 103 to the surroundings is small even if the robot 103 is not be able to be immediately stopped in emergency, and thus, the reception interval of the state signal is set long.

Figure 7:
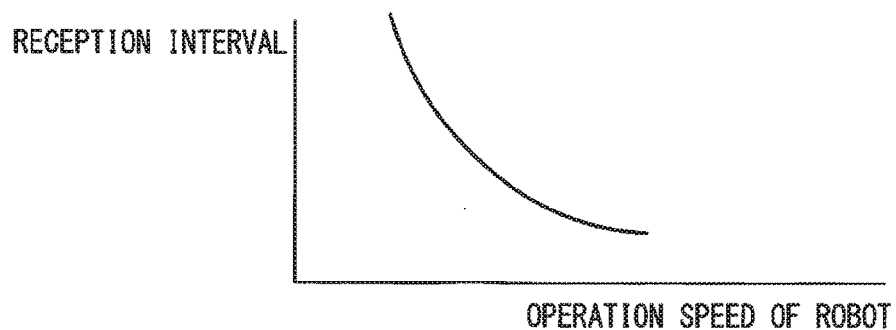
FIG. 7 illustrates an example of a relationship between a reception interval by the control apparatus of periodic data used for determination of whether to stop an operation of the robot and an operation speed of the robot.

As described above, when the reception interval change unit 22 changes the reception interval in response to the operation speed information indicating the operation speed of the robot 103 transmitted by the wireless communication unit 21 to the wireless teaching pendant 101, the reception interval change unit 22 sets the reception interval of when the operation speed of the robot 103 indicated by the operation speed information is fast shorter than the reception interval of when the operation speed of the robot 103 indicated by the operation speed information is slow in any of these cases when the periodic data received from the wireless teaching pendant 1 is the LIVE signal and when the periodic data is the state signal indicating whether to perform the emergency stop. In other words, in the second embodiment, the reception interval change unit 22 sets the reception interval of the periodic data used for determination of whether to stop the operation of the robot 103 short when the operation speed of the robot 103 indicated by the operation speed information is fast and sets the reception interval of the periodic data used for determination of whether to stop the operation of the robot 103 long when the operation speed of the robot 103 indicated by the operation speed information is slow. When the wireless communication unit 21 cannot easily receive the LIVE signal within the time period determined by the reception interval set by the reception interval change unit 22, or when the state signal indicating whether to perform an emergency stop cannot easily be received within the time period determined by the reception interval set by the reception interval change unit 22, the stop unit 23 stops the operation of the robot 103. FIG. 7 illustrates an example of a relationship between the reception interval by the control apparatus of the periodic data used for determination of whether to stop the operation of the robot and the operation speed of the robot. As described above, in the second embodiment, the reception interval change unit 22 sets the reception interval short when the operation speed of the robot 103 indicated by the operation speed information is fast and sets the reception interval long when the operation speed of the robot 103 indicated by the operation speed information is slow, and thus, for example, the reception interval change unit 22 may set the reception interval in an inverse proportion relationship in which the reception interval is shortened along with an increase of the operation speed of the robot 103 indicated by the operation speed information as illustrated in FIG. 7.

Next, an example is described below in which the reception interval is changed by the reception interval change unit 22 in response to the operation mode of the robot 103.

In terms of the operation mode of the robot specified in ISO 10218-1, it can be said that the manual reduced speed mode corresponds to "a case in which the operation speed of the robot 103 indicated by the operation speed information is slow", and the manual high speed mode corresponds to "a case of in which the operation speed of the robot 103 indicated by the operation speed information is fast". Therefore, when the reception interval of the periodic data used for determination of whether to stop the operation of the robot 103 is changed by the reception interval change unit 22 in response to the operation mode of the robot 103, the principle of operation similar to that of the operation speed information of the robot 103 described above can be applied. In other words, the reception interval change unit 22 sets the reception interval of the periodic data used for determination of whether to stop the operation of the robot 103 when the operation mode of the robot 103 is the manual high speed mode shorter than the reception interval of the periodic data used for determination of whether to stop the operation of the robot 103 when the operation mode of the robot 103 is the manual reduced speed mode. In other words, the reception interval change unit 22 sets the reception interval of the periodic data used for determination of whether to stop the operation of the robot 103 short when the robot 103 is in the manual high speed mode and sets the reception interval of the periodic data used for determination of whether to stop the operation of the robot 103 long when the robot 103 is in the manual reduced speed mode. When the wireless communication unit 21 cannot easily receive the LIVE signal within the time period determined by the reception interval set by the reception interval change unit 22, or when the state signal indicating whether to perform the emergency stop cannot easily be received within the time period determined by the reception interval set by the reception interval change unit 22, the stop unit 23 stops the operation of the robot 103.

Figure 8:
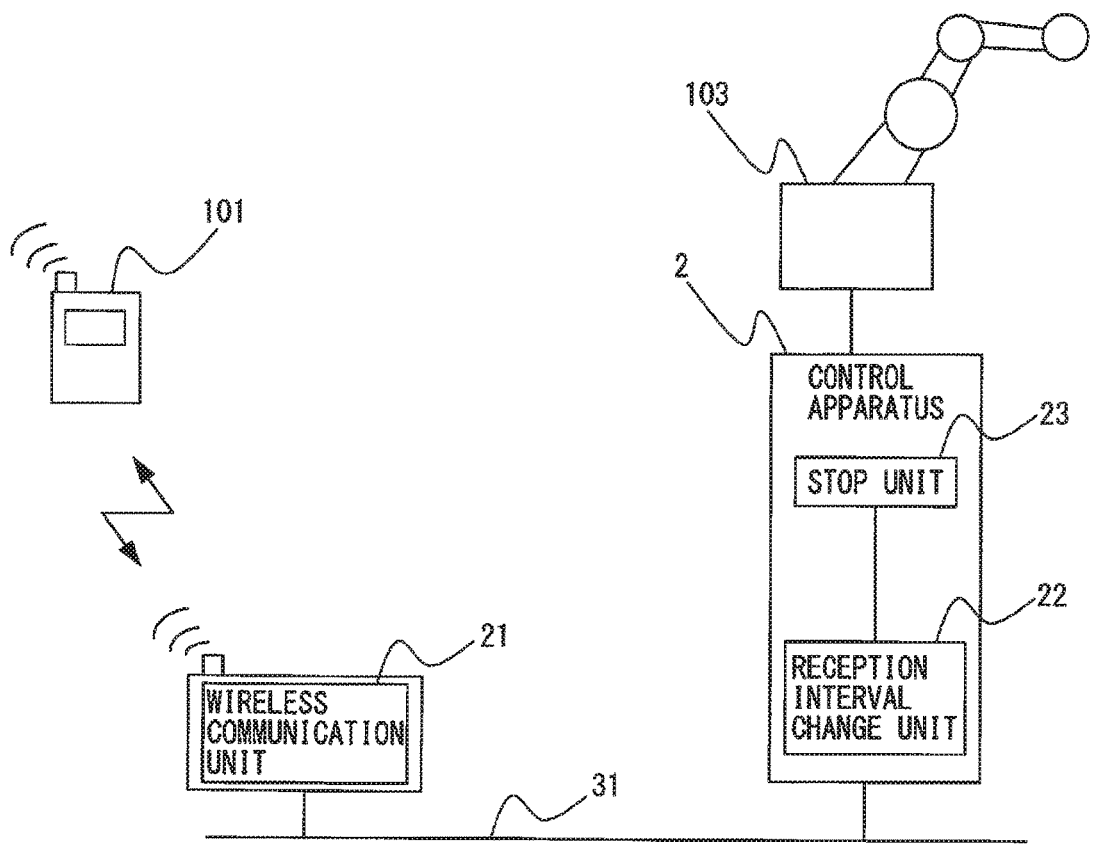
FIG. 8 illustrates a control apparatus of a robot according to a modification of the second embodiment.
Figure 11A:
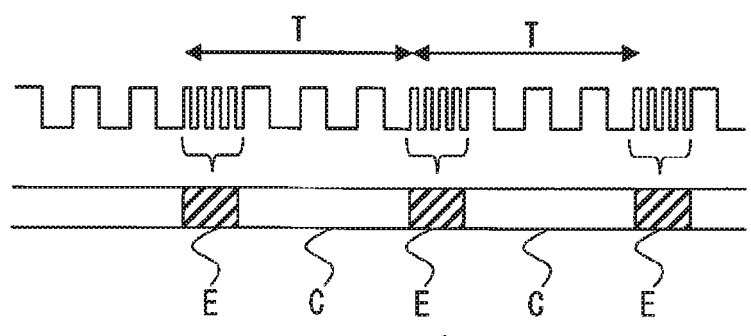
FIG. 11A and FIG. 11B illustrate transmission and reception of emergency stop signals in the automatic machine system including the control apparatus of the robot or the machine tool and the wireless teaching pendant.
Figure 11B:
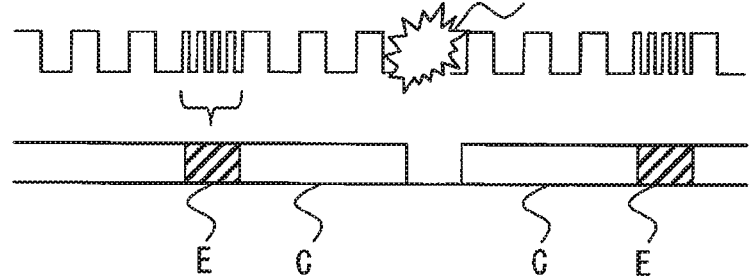

FIG. 8 illustrates the control apparatus of the robot according to a modification of the second embodiment. According to the second embodiment illustrated in FIG. 5, the wireless communication unit 21 is disposed on a position physically attached to the control apparatus 2, and as a modification thereof, the wireless communication unit 21 may be connected to the control apparatus 2 including the reception interval change unit 22 via a wired network 31. For example, the wireless communication unit 21 may be configured by a wireless local area network (LAN) router or an access point, and the wired network may be configured by the Ethernet (registered trademark).

According to the above-described first and second embodiments, the control target of the control apparatus is the robot, however, when the control target of the control apparatus is the machine tool, the embodiments can be similarly applied thereto. For example, when the control target of the control apparatus is the machine tool, the operation speed of the machine tool specified in the operation speed information may be a main shaft speed, a feed shaft speed of each shaft of a workpiece and a blade edge, and the like. When the control target of the control apparatus is the machine tool, there is no change in the reception interval and the transmission interval according to the operation mode of the robot specified in ISO 10218-1.

According to the above-described first and second embodiments, an operation for ensuring safety is described as the emergency stop of the robot or the machine tool, however, a protective stop of the robot or the machine tool may be executed.

According to the present invention, the wireless teaching pendant, the control apparatus of the robot or the machine tool, and the automatic machine system including the same can be realized which are reliable and can ensure safety even when wireless communication is unstable between the wireless teaching pendant and the control apparatus of the robot or the machine tool.

According to the first embodiment, the transmission interval of the periodic data transmitted from the wireless teaching pendant is set short when the operation speed of the robot or the machine tool is fast, and the transmission interval of the periodic data transmitted from the wireless teaching pendant is set long when the operation speed of the robot or the machine tool is slow, so that safety can be ensured even when the wireless communication is unstable between the wireless teaching pendant and the control apparatus of the robot or the machine tool. When the operation speed of the robot or the machine tool is slow, it can avoid the emergency stop from occurring too often. The emergency stop is performed when the LIVE signal for confirming establishment of the wireless communication between the wireless teaching pendant and the control apparatus of the robot or the machine tool cannot easily be received. Further, when the operation speed of the robot or the machine tool is fast, the transmission interval of the state signal (the emergency stop signal) indicating performing of the emergency stop from the wireless teaching pendant is set short, so that the robot or the machine tool can be stopped in a short time after the state signal indicating performing of the emergency stop is output from the wireless teaching pendant. If the communication becomes unstable, and the state signal indicating whether to perform the emergency stop cannot easily be received, a next state signal can be immediately received, so that the robot can be stopped in a short time.

According to the second embodiment, the reception interval of the periodic data used for determination of whether to stop the operation of the robot or the machine tool is set short when the operation speed of the robot or the machine tool is fast, and the reception interval of the periodic data used for determination of whether to stop the operation of the robot or the machine tool is set long when the operation speed of the robot or the machine tool is slow. Further, when the control apparatus of the robot or the machine tool cannot easily receive the LIVE signal within the time period determined by the set reception interval, or when the control apparatus of the robot or the machine tool cannot easily receive the state signal indicating whether to perform the emergency stop within the time period determined by the set reception interval, the operation of the robot or the machine tool is stopped, so that safety can be ensured even when the wireless communication is unstable between the wireless teaching pendant and the control apparatus of the robot or the machine tool When the operation speed of the robot or the machine tool is slow, it can avoid the emergency stop from occurring too often. The emergency stop is performed when the LIVE signal for confirming establishment of the wireless communication between the wireless teaching pendant and the control apparatus of the robot or the machine tool cannot easily be received. Further, when the operation speed of the robot or the machine tool is fast, the reception interval of the state signal indicating whether to perform the emergency stop from the wireless teaching pendant is set short, so that the robot can be stopped in a short time even when the communication becomes unstable after the state signal indicating whether to perform the emergency stop is output from the wireless teaching pendant, and the state signal indicating whether to perform the emergency stop cannot easily be received within the time period determined by the above-described reception interval.

What is claimed is:

1. An automatic machine system including a control apparatus of a robot or a machine tool and a wireless teaching pendant connected to the control apparatus via wireless communication and configured to operate the control apparatus, the automatic machine system comprising:
   a wireless communication unit configured to perform wireless communication between the wireless teaching pendant and the control apparatus; and
   an interval change unit configured to change a transmission interval from the wireless teaching pendant or a reception interval by the control apparatus of periodic data used by the control apparatus for determination of whether to stop an operation of the robot or the machine tool, the periodic data being transmitted from the wireless teaching pendant to the control apparatus,
   wherein the control apparatus stops the operation of the robot or a machine control when the control apparatus is not able to receive the periodic data within the time period determined by the set reception interval.

2. A wireless teaching pendant for operating a control apparatus of a robot or a machine tool by wireless communication, the wireless teaching pendant comprising:
   a wireless communication unit configured to perform wireless communication with the control apparatus; and
   a transmission interval change unit configured to change a transmission interval of periodic data, which is used for determining whether to stop an operation of the robot or the machine by the control apparatus, transmitted by the wireless communication unit to the control apparatus,
   wherein the control apparatus stops the operation of the robot or a machine control when the control apparatus is not able to receive the periodic data transmitted by the wireless communication unit within the time period determined by the set reception interval.

3. The wireless teaching pendant according to claim 2, wherein the transmission interval change unit changes the transmission interval in response to operation speed information indicating an operation speed of the robot or the machine tool received from the control apparatus via the wireless communication unit.

4. The wireless teaching pendant according to claim 3, wherein the transmission interval change unit sets the transmission interval of when an operation speed of the robot or the machine tool indicated by the operation speed information is fast shorter than the transmission interval of when an operation speed of the robot or the machine tool indicated by the operation speed information is slow.

5. The wireless teaching pendant according to claim 4, wherein the transmission interval change unit sets the transmission interval in an inverse proportion relationship in which the transmission interval is shortened along with an increase of an operation speed of the robot or the machine tool indicated by the operation speed information.

6. The wireless teaching pendant according to claim 2, wherein the transmission interval change unit sets the transmission interval of when operation mode information of the robot received from the control apparatus via the wireless communication unit indicates a manual high speed mode shorter than the transmission interval of when the operation mode information indicates a manual reduced speed mode.

7. The wireless teaching pendant according to claim 2, wherein the periodic data is a LIVE signal for confirming that wireless communication is established by the wireless communication unit with the control apparatus.

8. The wireless teaching pendant according to claim 2, wherein the periodic data is a state signal indicating whether to stop the robot or the machine tool in emergency transmitted from the wireless teaching pendant to the control apparatus.

9. A control apparatus of a robot or a machine tool controlled from a wireless teaching pendant by wireless communication, the control apparatus comprising:
  a wireless communication unit configured to perform wireless communication with the wireless teaching pendant; and
  a reception interval change unit configured to change a reception interval by the wireless communication unit of periodic data used for determination of whether to stop an operation of the robot or the machine tool transmitted from the wireless teaching pendant,
  wherein the control apparatus stops the operation of the robot or a machine control when the wireless communication unit is not able to receive the periodic data within the time period determined by the set reception interval.

10. The control apparatus according to claim 9, wherein the reception interval change unit changes the reception interval in response to operation speed information indicating an operation speed of the robot or the machine tool.

11. The control apparatus according to claim 10, wherein the reception interval change unit sets the reception interval of when an operation speed of the robot or the machine tool indicated by the operation speed information is fast shorter than the reception interval of when an operation speed of the robot or the machine tool indicated by the operation speed information is slow.

12. The control apparatus according to claim 11, wherein the reception interval change unit sets the reception interval in an inverse proportion relationship in which the reception interval is shortened along with an increase of an operation speed of the robot or the machine tool indicated by the operation speed information.

13. The control apparatus according to claim 9, wherein the reception interval change unit sets the reception interval of when an operation mode of the robot is a manual high speed mode shorter than the reception interval of when an operation mode of the robot is a manual reduced speed mode.

14. The control apparatus according to claim 9, wherein the periodic data is a LIVE signal for confirming that wireless communication is established by the wireless communication unit with the wireless teaching pendant, and
  the control apparatus comprises a stop unit configured to stop an operation of the robot or the machine tool when the wireless communication unit is not able to receive the LIVE signal within a time period determined by the reception interval.

15. The control apparatus according to claim 9, wherein the periodic data is a state signal indicating whether to stop the robot or the machine tool in emergency transmitted from the wireless teaching pendant to the control apparatus, and
  the control apparatus comprises a stop unit configured to stop an operation of the robot or the machine tool when the wireless communication unit is not able to receive the state signal within a time period determined by the reception interval.

16. The control apparatus according to claim 9, wherein the wireless communication unit is connected to the reception interval change unit via a wired network.

* * * * *